United States Patent
Garrett et al.

(10) Patent No.: US 7,957,328 B2
(45) Date of Patent: Jun. 7, 2011

(54) METHOD AND SYSTEM FOR COMMUNICATING TO RADIO FREQUENCY INTEGRATED CIRCUIT

(75) Inventors: David Garrett, Santa Clara, CA (US);
Robert Lorenz, Santa Clara, CA (US);
Trevor Pearman, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 840 days.

(21) Appl. No.: 11/701,009

(22) Filed: Jan. 31, 2007

(65) Prior Publication Data

US 2008/0181142 A1   Jul. 31, 2008

Related U.S. Application Data

(60) Provisional application No. 60/763,819, filed on Jan. 30, 2006.

(51) Int. Cl.
*H04B 7/005* (2006.01)
(52) U.S. Cl. ........................................ 370/278
(58) Field of Classification Search .................. None
See application file for complete search history.

(56) References Cited

U.S. PATENT DOCUMENTS

| 5,742,589 | A  | * | 4/1998 | Murata | 370/249 |
| 6,138,040 | A  | * | 10/2000 | Nicholls et al. | 455/569.1 |
| 2002/0115457 | A1 | * | 8/2002 | Koscal | 455/466 |
| 2003/0160149 | A1 | * | 8/2003 | Dwyer et al. | 250/208.1 |
| 2004/0228340 | A1 | * | 11/2004 | Akella et al. | 370/386 |
| 2005/0043948 | A1 | * | 2/2005 | Kashihara et al. | 704/242 |
| 2005/0152311 | A1 | * | 7/2005 | Park | 370/331 |
| 2005/0223410 | A1 | * | 10/2005 | Li et al. | 725/135 |
| 2008/0181142 | A1 | * | 7/2008 | Garrett et al. | 370/280 |

* cited by examiner

*Primary Examiner* — Seema Rao
*Assistant Examiner* — Jianye Wu
(74) *Attorney, Agent, or Firm* — McAndrews, Held & Malloy, Ltd.

(57) ABSTRACT

A method and system for managing change-over in radio functionality at a radio front-end in a Time Division Duplexing (TDD) system is provided. The method comprises storing one or more control commands. The one or more control commands may correspond to the change-over. The change-over may be a transmitter-to-receiver change-over or a receiver-to-transceiver change-over. The method further comprises receiving a trigger time corresponding to the one or more control commands. The trigger time comprises a timing requirement for the change-over. Thereafter, one or more control commands are released based on a predetermined condition.

14 Claims, 4 Drawing Sheets

METHOD AND SYSTEM FOR COMMUNICATING TO RADIO FREQUENCY INTEGRATED CIRCUIT

RELATED APPLICATIONS

This application claims priority to U.S. Provisional Patent Application No. 60/763,819, filed Jan. 30, 2006, which is entitled "High Speed RFIC Interface."

BACKGROUND OF THE INVENTION

The present invention generally relates to communication in a time division duplexing (TDD) system. More specifically, the present invention relates to providing a method and system for managing change-over in radio functionality, such as transmit-to-receive or receive-to-transmit, at a radio front-end in a TDD system.

In TDD systems, it is required to switch between transmit (TX) and receive (RX) functionalities in a radio portion of the TDD systems. This switching between TX and RX needs to occur at relative precise time instances. In addition to the switching, it is often necessary to send control information to a Radio frequency Integrated Circuit (RF IC) in order to adapt its functionality to conditions that evolve over time.

Further, a radio front-end of a communication device in a TDD system may have to switch back and forth between RX and TX functionalities. For this purpose, conventionally, the control information is sent to the radio front-end using a plurality of control commands. The control commands need to be applied at different time stamps to reflect the constraints or desired results, based on several finite physical quantities. The finite physical quantities may comprise a settling time of a filter, a time constant associated with a bias circuitry in a power amplifier of a transmitter, etc.

Moreover, in conventional TDD systems, the control commands are transmitted from a baseband processing integrated circuit (IC) to a RF IC over a serial interface. In addition to the serial interface, there can be additional signals, General Purpose Input/Output (GPIO) signals that connect the RF ICs and baseband ICs. In such a system, the control commands are transferred over the serial interface and subsequent to the control commands, the GPIO signals are used to affect the previously transferred control commands. Such serial interfaces may require one or more GPIO signals between the RF ICs and baseband ICs. These additional GPIO pins add additional size and cost to the system. Also, the additional GPIO signals impose an overhead on the system thereby decreasing throughput of the system.

Further, in some conventional applications, a microprocessor is used to control the serial interface. In these applications the control commands in the RF IC have an immediate effect. Specifically, when the control commands need to be sent, the microprocessor is interrupted with a high priority low latency interrupt. The control commands are sent by the microprocessor and they have an immediate effect in the RF IC. Specifically, the microprocessor stops the running tasks and sends the control commands at the precise time, and then it goes back to the tasks it was performing before being interrupted. The high priority low latency interrupts place real-time constraints on the microprocessor. Additionally, the microprocessor takes some time to respond to the interrupt. Therefore, it is necessary to interrupt the microprocessor slightly in advance. However, the time the microprocessor takes to respond to the interrupt is variable; therefore, the timing of control commands may be less accurate than desired. Moreover, the requirement of accurate timing places a significant constraint on the control software.

Furthermore, in some communication systems, a real time operating system (RTOS) is used, for instance, to control many aspects of the communication system, to enable a plurality of tasks to run in parallel, to allow communication between tasks, and to provide other useful software functions. However, some RTOSs suffer from a significant latency and variability, which are associated with an interrupt. This latency and variability may be reduced, but often at the expense of system performance.

Therefore, there is a need for a method and system that allows control information to be applied in RF ICs at a precise time, without the overhead of additional signals being placed on the software.

SUMMARY

Various embodiments provide a method and system to manage change-over in radio functionality at a radio front-end in a Time Division Duplexing (TDD) system.

An embodiment provides a method and system to transfer one or more control commands and timing information on an interface between baseband functionality and RF functionality in a TDD system.

Yet another embodiment provides a method and system to match a trigger time with a count of a counter and releasing the one or more control commands at the precise time when a match is found.

Embodiments described above include a method for reducing change-over overhead of a radio front-end in the TDD system. The method comprises storing at least one control command corresponding to the change-over. The at least one control command can be stored in a first-in-first-out (FIFO) queue. Further, a trigger time corresponding to the at least one control command is received. The trigger time corresponds to a timing requirement of the change-over, that is, the precise time at which the change-over is desired. The at least one control command is, then, released based on a predetermined condition. The predetermined condition comprises matching a count of a counter with the trigger time at predetermined intervals of time. The at least one control command is released, if the trigger time matches the count of the counter.

Further, embodiments described above comprise providing a system for managing change-over in radio functionality at a radio front-end in a TDD system. The system comprises a storing module configured for storing the at least one control command and for saving the trigger time corresponding to the at least one control command. The system further comprises a counting module configured for maintaining the counter based on the trigger time and for incrementing the count of the counter at the predetermined intervals of time. A matching module then matches the count of the counter with the trigger time at each predetermined interval of time. A releasing module releases the at least one control command from the storing module, if the trigger time matches the count of the counter.

BRIEF DESCRIPTION OF THE DRAWINGS

The foregoing objects and advantages of the present invention, a method and system for managing change-over in radio functionality at a radio front-end in a TDD system, may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
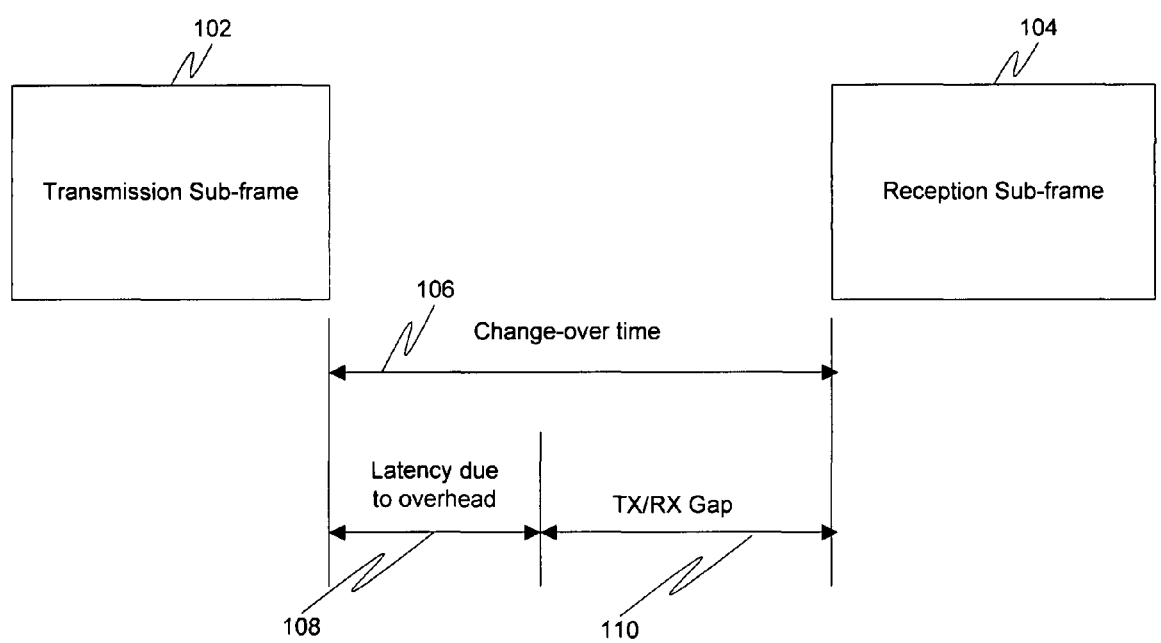
FIG. 1 is a timing diagram showing time stamps involved in a change-over from a transmission (TX) mode to a reception (RX) mode in a TDD system.

Before describing in detail embodiments that are in accordance with the present invention, it should be observed that the embodiments reside primarily in combinations of method steps and system components for managing change-over in radio functionality at a radio front-end in a TDD system. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

Various embodiments provide method and system for managing change-over in radio functionality at a radio front-end in a TDD system. In accordance with the present invention, one or more control commands corresponding to change-over in radio functionality are obtained and stored in a baseband processing function in the TDD system. The one or more control commands are then released and forwarded to a radio frequency (RF) processing function at the precise time when the change-over is desired.

FIG. 1 is a timing diagram showing time stamps involved in change-over from a transmission mode to a reception mode in a TDD system. It will be appreciated by those skilled in the art that in TDD systems, data packets are transmitted and received by one or more communication devices on a same channel, but at different time stamps. Thus, successive data frames are utilized for communication between one or more communication devices in a TDD system. Each data frame can be defined by a predetermined duration of time. FIG. 1 illustrates a transmission sub-frame 102 and a reception sub-frame 104. Transmission sub-frame 102 represents the time for which a communication device operates in the transmission mode in the TDD system. Reception sub-frame 104 represents the time for which the communication device operates in the reception mode. FIG. 1 also illustrates a change-over time 106 that represents the time required to change-over from the transmission mode to the reception mode.

Further, change-over time 106 of the communication device in the TDD system may include a latency due to overhead 108 and a TX/RX gap 110. TX/RX gap is also known as turn-around time or channel turn-around time. TX/RX gap 110 is mainly due to delays caused in the change-over due to finite physical quantities such as settling time of filters, etc. Latency due to overhead 108 can include time spent for processing high priority interrupts for the change-over.

Further, conventionally, an overhead of additional signals is also placed on software in the TDD system. The additional signals in the TDD wireless communication systems may be General Purpose Input/Output (GPIO) signals. The GPIO signals may be required to bring into effect one or more control commands transferred over a serial interface connecting a baseband processing function and a RF processing function of the communication device. Thus, in conventional methods, additional GPIO pins are required for processing the control commands corresponding to the change-over.

In accordance with the present invention, latency due to overhead 108 is minimized by obviating the need of using high priority interrupts for the change-over. Also, the overhead of additional GPIO pins can be minimized, in accordance with an embodiment.

Figure 2:
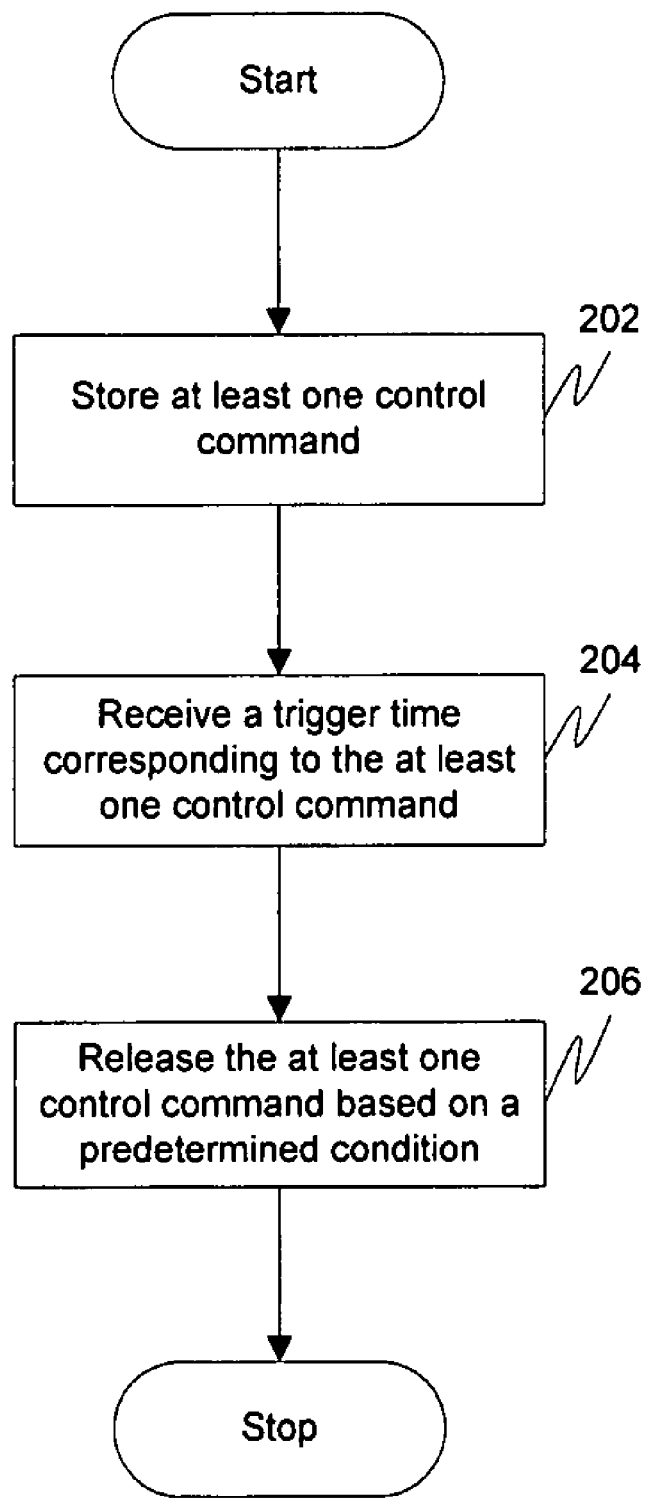
FIG. 2 is a flowchart of a method for managing change-over in radio functionality at a radio front-end in a TDD system, in accordance with an embodiment.

FIG. 2 is a flowchart of a method for managing change-over in radio functionality at a radio front-end in a TDD system, in accordance with an embodiment. In order to optimize the change-over process, the method comprises sending one or more control commands corresponding to the change-over to a RF processing function at a precise time, in accordance with an embodiment. At 202, one or more control commands are stored. The one or more control commands may correspond to the change-over. The change-over may be a transmitter-to-receiver change-over or a receiver-to-transceiver change-over.

The one or more control commands may comprise information about the parameters of RF ICs in the TDD system. Further, the one or more control commands may comprise a plurality of control words. Accordingly, the one or more control commands may be stored in a first-in-first-out (FIFO) queue. At 204, a trigger time is received corresponding to the one or more control commands. The trigger time comprises a timing requirement for the change-over. The timing requirement may comprise a change-over time. The change-over time is the precise time at which the change-over in the radio functionality is desired. Moreover, the change-over can be optimized further by subtracting a predetermined time from the change-over time. The predetermined time may correspond to time required by physical components of the radio to settle down after a change-over is initialized. The one or more control commands and the corresponding trigger time may be received and stored in non-real time. Those skilled in the art will realize that the one or more control commands can be predetermined, since the control commands for the transmitter-to-receiver change-over or for the receiver-to-transmitter change-over may remain constant for communication devices communicating with each other in a TDD system. Thus, the one or more control commands can be stored before the change-over in the radio functionality is desired. Therefore, the need for interrupting a microprocessor that controls the serial interface with high priority interrupts is obviated. Moreover, by saving on the time to process the high priority interrupts, the latency due to overhead 108, as depicted in FIG. 1, is minimized.

Upon receiving the trigger time corresponding to the one or more control commands, the one or more control commands are released based on a predetermined condition, at step 206. The predetermined condition may comprise matching a count of a counter with the trigger time at predetermined intervals of time. The counter can be a free running counter, which is set based on the trigger time. The count of the counter is incremented at every predetermined interval of time, that is, periodically. After each increment, the count of the counter is matched with the trigger time. When the count and the trigger time match, the one or more control commands are released into the serial interface and forwarded to a RF processing function. The counter provides a highly accurate mechanism for keeping time. The one or more control commands are released at an instant the count of the counter matches the trigger time. The one or more control commands may accomplish the change-over. Therefore, the change-over is performed at a precise time. Consequently, no additional signals, such as GPIO signals, are required for bringing the control commands into effect. This minimizes the latency due to overhead 108 caused by the overhead placed on the system by the additional signals. This has been explained in conjunction with FIG. 1 above. In case the one or more control commands are stored in a FIFO queue, the releasing comprises emptying the contents of a FIFO queue on to the serial interface. The serial interface can, then, deliver the one or more control commands to the RF processing function. After releasing the one or more control commands, the count of the counter may be reset. A next control command and a next trigger time corresponding to a next change-over can then be stored, and the count of the counter can be set accordingly.

Figure 3:
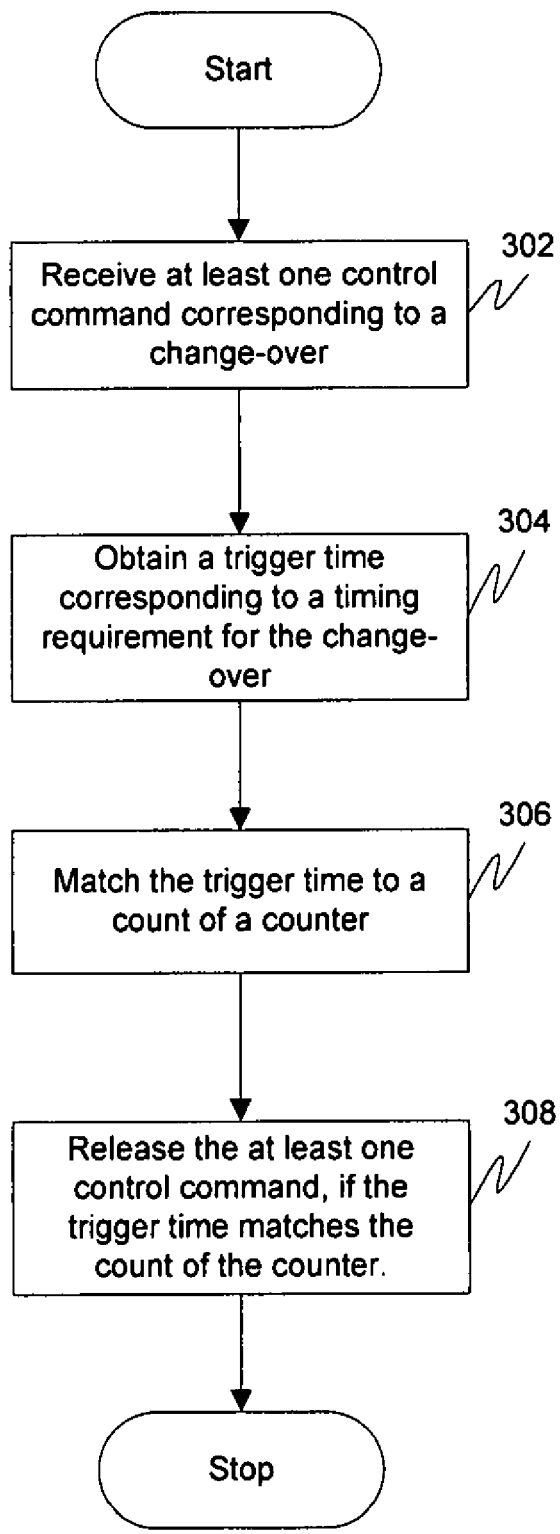
FIG. 3 is a flowchart of a method for reducing change-over overhead of a radio front-end in a TDD system, in accordance with an embodiment.

FIG. 3 is a flowchart of a method for reducing change-over overhead of radio front-end in a Time Division Duplexing (TDD) system, in accordance with an embodiment. At 302, one or more control commands corresponding to a change-over is received. The desired change-over can be a transmitter-to-receiver change-over or a receiver-to-transmitter change-over. As mentioned above, the one or more control commands may be received and stored in non-real time. The method does not require interrupts to send the one or more control commands to a RF processing function from a baseband processing function. Therefore, no real-time constraints are placed on a microprocessor that controls a serial interface between the baseband processing function and the RF processing function. This minimizes the latency due to overhead 108 caused due to high priority interrupts. This has been explained in conjunction with FIG. 1 and FIG. 2 above. Thereafter, at 304, a trigger time corresponding to a timing requirement for the change-over is obtained. The timing requirement may comprise a change-over time or a predetermined time subtracted from change-over time. This has been explained in detail in conjunction with FIG. 2 above. At 306, the trigger time is matched with a count of a counter. The count of counter is incremented at predetermined intervals of time. After each increment of the counter, the count is matched with the trigger time. This has been explained in conjunction with FIG. 2 above. Further, at 306, the one or more control commands are released on the serial interface when the trigger time matches the count of the counter. The one or more control commands may accomplish the change-over. Therefore, the method does not require additional signals like GPIO signals for bringing the control commands into affect. This minimizes the latency due to overhead 108 caused by the overhead placed on the system by the additional signals. This has been explained in more detail in conjunction with FIG. 1 and FIG. 2 above. After releasing the one or more control commands, the count of the counter may be reset.

Figure 4:
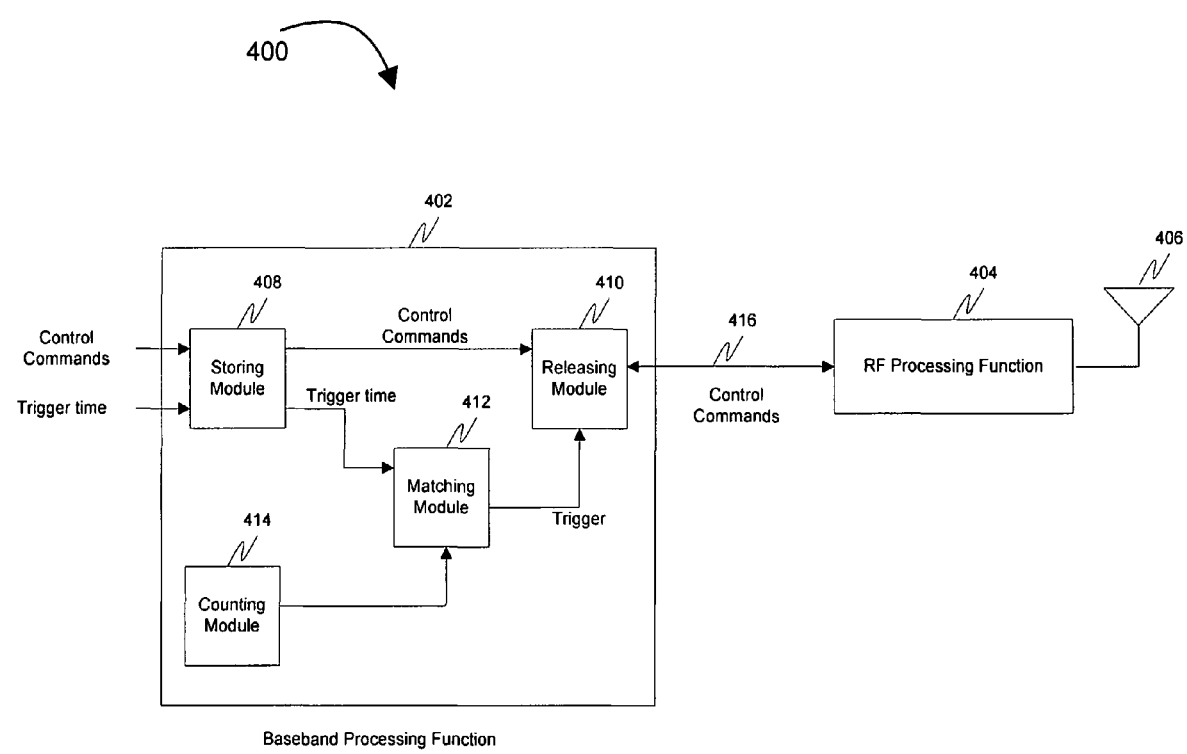
FIG. 4 is a block diagram of a system for managing change-over in radio functionality at a radio front-end in a TDD system, in accordance with an embodiment.

FIG. 4 is a block diagram of a system for managing change-over in radio functionality at a radio front-end in a Time Division Duplexing (TDD) system, in accordance with an embodiment. The system as illustrated in FIG. 4 includes a communication device 400 in a TDD system. Communication device 400 includes a baseband processing function 402, a RF processing function 404 and an antenna 406. Baseband processing function 402 obtains one or more control commands and corresponding trigger time, and releases the one or more control commands at a precise time depending on the corresponding trigger time. RF processing function 404 receives the one or more control commands and uses the one or more control commands for the change-over of radio functionality from transmitter-to-receiver or receiver-to-transmitter. The transmission or reception at communication device 400 of the TDD system is carried using antenna 406.

Further, baseband processing function 402 includes a storing module 408, a releasing module 410, a matching module 412 and a counting module 414. Storing module 408 receives and stores the one or more control commands for change-over in radio functionality, along with corresponding trigger time as shown in FIG. 4. The trigger time corresponds to a timing requirement for the change-over. Further, storing module 408 may receive the one or more control commands and the corresponding trigger time in non-real time, as mentioned earlier. Storing module 408 may store the one or more control commands in a FIFO queue, in accordance with an embodiment. Additionally, storing module 408 may store the one or more control commands and the corresponding trigger time in separate registers.

Further, counting module 414 in baseband processing function 402 can be an accurate hardware timer. Counting module 414 may set a count based on the trigger time. The count is incremented at predetermined intervals of time. Further, counting module 414 sends the updated value of the count to matching module 412 at the predetermined intervals of time. Matching module 412 retrieves the trigger time corresponding to the change-over from storing module 408. Matching module 412, then, matches the count received from counting module 414 with the trigger time at each predetermined intervals of time. When a match is found, matching module 412 sends a trigger signal to releasing module 410. After sending the trigger signal, the count in counting module 414 may be reset based on the next control command. Upon receiving the trigger signal, releasing module 410 releases the one or more control commands over serial interface 416. In an embodiment, where storing module 408 stores the one or more control commands in a FIFO queue, releasing module empties the FIFO queue, when it receives the trigger signal.

In accordance with an embodiment, serial interface 416 may be a three-wire serial peripheral interface (SPI). The 3-wire SPI bus utilizes a data-in terminal, a data-out terminal, and a serial clock terminal. The serial peripheral interface minimizes the control interconnections required and hence avoids any overhead due to additional GPIO signals.

Various embodiments of the present invention provide methods and systems for managing change-over in radio functionality at a radio front-end in a TDD system. The system receives and stores one or more control commands in non-real time. This minimizes the real-time constraints that interrupts place on the microprocessors. Additionally, this minimizes the latency due to overhead caused by microprocessor in switching from running certain tasks to sending control commands and vice versa. Further, the one or more control commands are transferred over a serial interface at precise time by using an accurate hardware timer. This minimizes the overhead placed by additional signals. Further, various embodiments of the invention provide methods that use lesser number of signals and thus, increase the throughput of the system.

What is claimed is:

1. A method for managing change-over in radio functionality at a radio front-end in a Time Division Duplexing (TDD) system, the method comprising:
   a. storing at least one control command;

b. receiving a trigger time corresponding to the at least one control command, wherein the trigger time corresponds to a timing requirement, the timing requirement being base at least in part on a time required by physical components of the radio front-end to settle down after a change-over is initialized; and c. releasing the at least one control command based on a predetermined condition, wherein the change-over occurs in response to the releasing, wherein the at least one control command corresponds to the change-over, the change-over being at least one of a transmitter-to-receiver change-over and a receiver-to-transmitter change-over, wherein the predetermined condition comprises matching a count of a counter module with the trigger time at predetermined intervals of time, the count of the counter module being incremented at the predetermined intervals of time, wherein the at least one control command is released, if the trigger time matches the count of the counter module.

2. The method of claim 1, wherein the timing requirement comprises one of a change-over time and a predetermined time subtracted from the change-over time.

3. The method of claim 1, wherein the counter module is reset in response to releasing the at least one control command.

4. The method of claim 1, wherein the releasing comprises at least one of
   a. communicating the at least one control command from a baseband processing function to an RF processing function; and
   b. communicating the at least one control command from the RF processing function to the baseband processing function.

5. The method of claim 1, wherein the at least one control command comprises one or more control command words.

6. The method of claim 1, wherein the at least one control command is stored in a first-in-first-out (FIFO) queue.

7. The method of claim 1, wherein the at least one control command is stored in non-real time.

8. The method of claim 1, wherein the at least one control command corresponds to a predetermined set of control commands.

9. A method for reducing change-over overhead of a radio front-end in a Time Division Duplexing (TDD) system, the method comprising:
   a. receiving at least one control command, the at least one control command corresponding to a change-over, the change-over being at least one of a transmitter-to-receiver change-over and a receiver-to-transmitter change-over;
   b. obtaining a trigger time corresponding to a timing requirement for the change-over; wherein the timing requirement is base at least in part on a time required by physical components of the radio front-end to settle down after a change-over is initialized:
   c. matching the trigger time to a count of a counter; and
   d. releasing the at least one control command, if the trigger time matches the count of the counter, wherein the change-over occurs in response to the releasing.

10. The method of claim 9, wherein the trigger time is matched with the count of the counter at predetermined intervals of time, wherein the count of the counter is incremented at the predetermined intervals of time.

11. A system for managing change-over in radio functionality at a radio front-end in a Time Division Duplexing (TDD) system, the system comprising:
   a. a storing module, the storing module configured for:
      i. storing at least one control command; and
      ii. saving a trigger time corresponding to the at least one control command wherein the trigger time corresponds to a timing requirement, wherein the timing requirement is base at least in part on a time required by physical components of the radio front-end to settle down after a change-over is initialized,
   b. a counting module, the counting module configured for:
      i. maintaining a counter based on the trigger time; and
      ii. incrementing a count of the counter at predetermined intervals of time;
   c. a matching module, the matching module matching the count of the counter with the trigger time at each predetermined interval of time; and
   d. a releasing module, the releasing module releasing the at least one control command from the storing module, if the trigger time matches the count of the counter; wherein
      the at least one control command corresponds to a change-over, the change-over being at least one of a transmitter-to-receiver change-over and a receiver-to-transmitter change-over.

12. The system of claim 11, wherein the trigger time corresponds to a timing requirement for the change-over.

13. The system of claim 11, wherein the counting module is configured to reset the counter, if the at least one control command is released from the storing module.

14. The system of claim 11, wherein the storing module is configured for storing the at least one control command in a first-in-first-out (FIFO) queue.

* * * * *